(12) United States Patent
Roemer

(10) Patent No.: US 7,270,547 B2
(45) Date of Patent: Sep. 18, 2007

(54) ADAPTER FOR CAR RADIOS

(75) Inventor: Michael Roemer, Staufenberg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/544,695

(22) PCT Filed: Oct. 20, 2004

(86) PCT No.: PCT/EP2004/052587

§ 371 (c)(1),
(2), (4) Date: Aug. 5, 2005

(87) PCT Pub. No.: WO2005/044629

PCT Pub. Date: May 19, 2005

(65) Prior Publication Data

US 2006/0079134 A1  Apr. 13, 2006

(30) Foreign Application Priority Data

Nov. 5, 2003   (DE) .............................. 103 52 169

(51) Int. Cl.
  *H01R 33/00*  (2006.01)
(52) U.S. Cl. ...................................... 439/34; 439/393
(58) Field of Classification Search ................. 439/34, 439/343
  See application file for complete search history.

(56) References Cited

U.S. PATENT DOCUMENTS

| | | | |
|---|---|---|---|
| 4,726,789 A | 2/1988 | Yaffe | |
| 4,805,233 A * | 2/1989 | Robitschko et al. | 455/346 |
| 4,866,416 A * | 9/1989 | Holzhauer et al. | 340/426.34 |
| 5,441,421 A | 8/1995 | Ponticelli, Jr. et al. | |
| 6,700,795 B1 * | 3/2004 | Jones et al. | 361/784 |
| 2006/0079134 A1 * | 4/2006 | Roemer | 439/638 |

FOREIGN PATENT DOCUMENTS

| | | |
|---|---|---|
| DE | 197 06 709 A1 | 9/1998 |
| DE | 200 02 852 U1 | 5/2000 |
| DE | 100 14 501 A1 | 10/2001 |
| ES | 2 013 012 A6 | 4/1990 |
| FR | 2 567 821 A3 | 1/1986 |
| FR | 2 592 345 A1 | 7/1987 |
| WO | WO98/26514 | 6/1998 |

OTHER PUBLICATIONS

International Search Report dated Apr. 7, 2005 issued for Application No. PCT/EP2004/052587.
German Search Report dated Nov. 17, 2003 issued for German Application No. 103 52 169.0.
Balanced Lines, Phantom Powering, Grounding, and Other Arcane Mysteries Loud Technologies Inc. 2003.
Microtune MT41X AM/FM Antenna Amplifier Series Product Brief PB-00057—Rev. 1.1 May 2005.

* cited by examiner

*Primary Examiner*—James R. Harvey
(74) *Attorney, Agent, or Firm*—Cohen Pontani Lieberman & Pavane LLP

(57) ABSTRACT

An adapter for electrical connections of a car radio has a plastic part containing integrated electrical plug-in connection arrangement and mechanically fixable to a car component that does not have any electrical connection with the adapter.

7 Claims, 2 Drawing Sheets

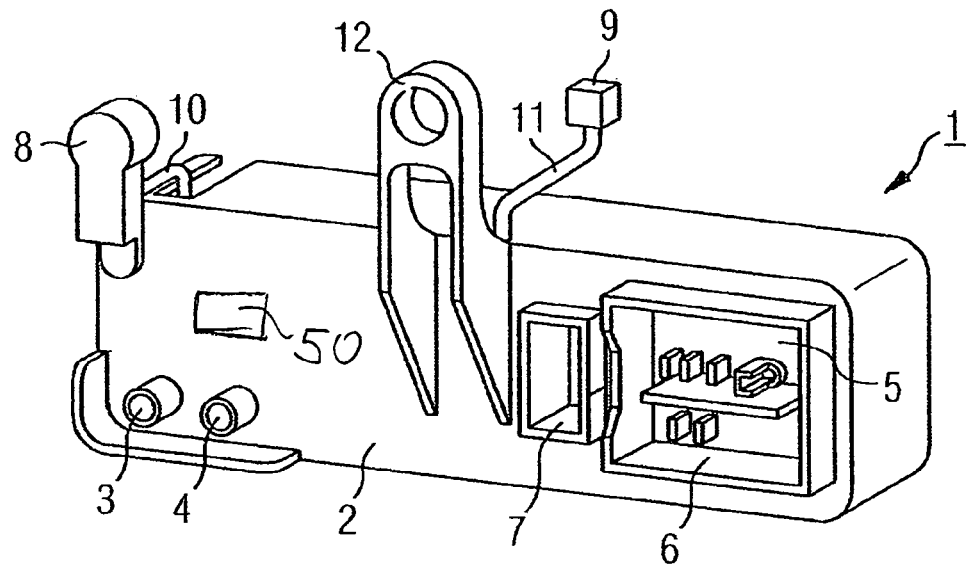
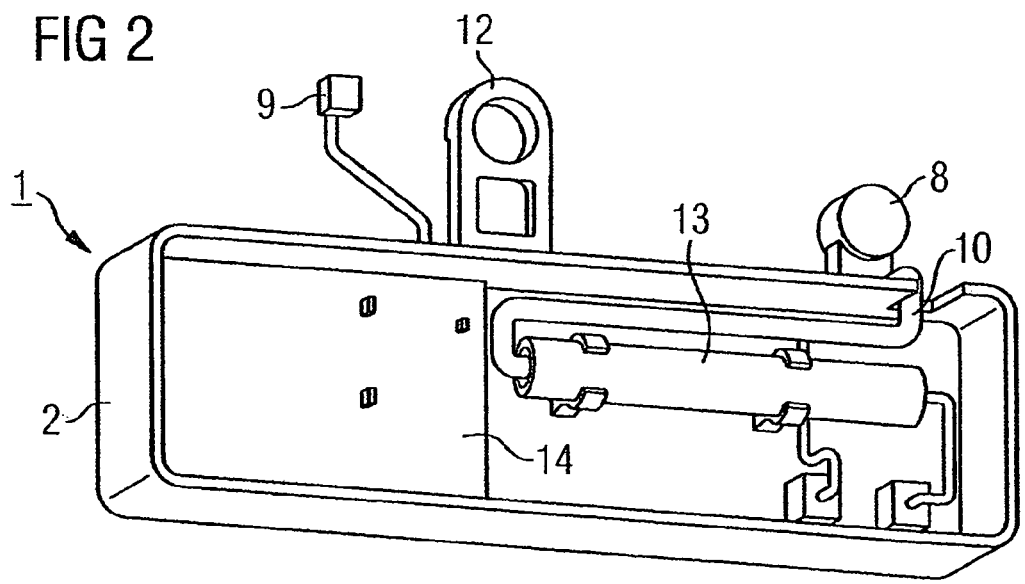

ADAPTER FOR CAR RADIOS

PRIORITY CLAIM

This is a U.S. national stage of application No. PCT/EP2004/052587, filed on 20 Oct. 2004. Priority under 35 U.S.C. §119(a) and 35 U.S.C. §365(b) is claimed from German Application No. 103 52 169.0, filed 05 Nov. 2003.

BACKGROUND OF THE INVENTION

1. Field of the Invention

The invention relates to an adapter for the electrical connections of a car radio.

2. Description of the Related Art

On their rear side, car radios have plug-in connectors which are used to set up a connection to a cable harness in the vehicle. There are a wide variety of embodiments and configurations of the plug-in connectors. This results in the problem that not every car radio can be readily connected in each vehicle since the plug-in connectors on the car radio and on the cable harness of the vehicle are designed differently. On one hand, this makes it more difficult for the end user to retrofit a car radio and, on the other hand, requires the car radio manufacturer, during initial installation, to constantly adapt the plug-in connectors to the differently designed plug-in connectors of various vehicle manufacturers or sometimes even to various plug-in connectors of various vehicle models of a single manufacturer. As a result, different variants of the device are required solely on account of the different plug-in connectors. In addition to considerable development and tool costs, this also leads to increased logistical complexity.

As an alternative to adapting the plug-in connectors of the car radio to the special plug-in connector of the vehicle cable harness, use may be made of adapter cables which have the respective compatible mating connectors for the car radio and the cable harness at their ends. In this case, a separate adapter cable is then generally required for each plug-in connection, thus resulting in increased plug-in complexity during installation of the radio and in a confusing installation situation ("cable clutter") in the case of preinstalled adapter cables.

Therefore, it is an object of the invention to specify an adapter for electrical connections of a car radio, the adapter avoiding the abovementioned disadvantages and facilitating installation.

SUMMARY OF THE INVENTION

In the case of an adapter for electrical connections of a car radio, the object is achieved, according to the invention, by virtue of the fact that the adapter is in the form of a plastic part in which electrical plug-in connectors are integrated and which can be mechanically fixed to a vehicle component which does not have an electrical connection to the adapter. The use of the adapter according to the invention makes it possible to use car radios in vehicles having different types of plug-in connector without adapting the plug-in connectors of the device and thus generating different variants of the device. The adapter according to the invention is in the form of a plastic part which can be mechanically fixed to a vehicle component. The plastic part has various electrical plug-in connectors which have both the mating connectors for the vehicle cable harness and those for the car radio plug-in connectors. If the plastic part is then mechanically fixed to the vehicle component, the plug-in connector of the vehicle cable harness can be initially connected to the adapter. The plug-in connector of the car radio can then be electrically connected to the adapter via a cable. There is therefore no need to adapt the plug-in connectors of the car radio to the plug-in connectors of the cable harness. In addition, fixing the adapter to a vehicle component provides a defined installation position which is considerably clearer than when using adapter cables.

The vehicle component is preferably a radio slot, the plastic part being designed to be fitted to the radio slot. If the vehicle thus has two radio slots, the car radio can be installed in one radio slot and the plastic part can be fitted to the rear side of the second radio slot which, for example, serves as a compartment. If the plastic part is of cuboidal design and has an open outer wall, this results in a particularly simple way of adapting the plastic part to the dimensions of a radio slot or of another suitable motor vehicle component and of fitting it to the latter.

The adapter preferably has at least two multipole electrical plug-in connectors having a different contact arrangement and/or contact assignment. In this case, one of the electrical plug-in connectors may have the contact arrangement and/or contact assignment of the plug-in connector of the car radio, while the second plug-in connector has the contact arrangement and/or contact assignment of a corresponding plug-in connector of the vehicle cable harness.

In addition, the adapter may have an antenna socket and an antenna connector which is connected to the antenna socket via a self-supporting connecting line. In this case, the adapter may, in particular, contain means for antenna phantom powering, with the result that a car radio which, per se, is not designed for antenna phantom powering (while such antenna phantom powering is, however, provided in the vehicle) can also be used in the vehicle and the advantages of antenna phantom powering are retained.

The adapter may also contain means for implementing a CAN bus connection. In this case too, a car radio which, per se, does not have a CAN bus connection can be connected to a CAN bus of a vehicle and all associated advantages can be realized. If car radios having a CAN bus connection are thus provided by the manufacturer, use of the adapter according to the invention having means for implementing a CAN bus connection means that a radio without a CAN bus can also be used during retrofitting without having to accept disadvantages in comparison with a mass-produced car radio.

BRIEF DESCRIPTION OF THE DRAWING

The invention will be described in more detail below with reference to an exemplary embodiment and the drawing, in which:

FIG. 1 shows a first view of an adapter according to the invention;

FIG. 2 shows a second view of an adapter according to the invention; and

DETAILED DESCRIPTION OF THE PRESENTLY PREFERRED EMBODIMENTS

Figure 3:
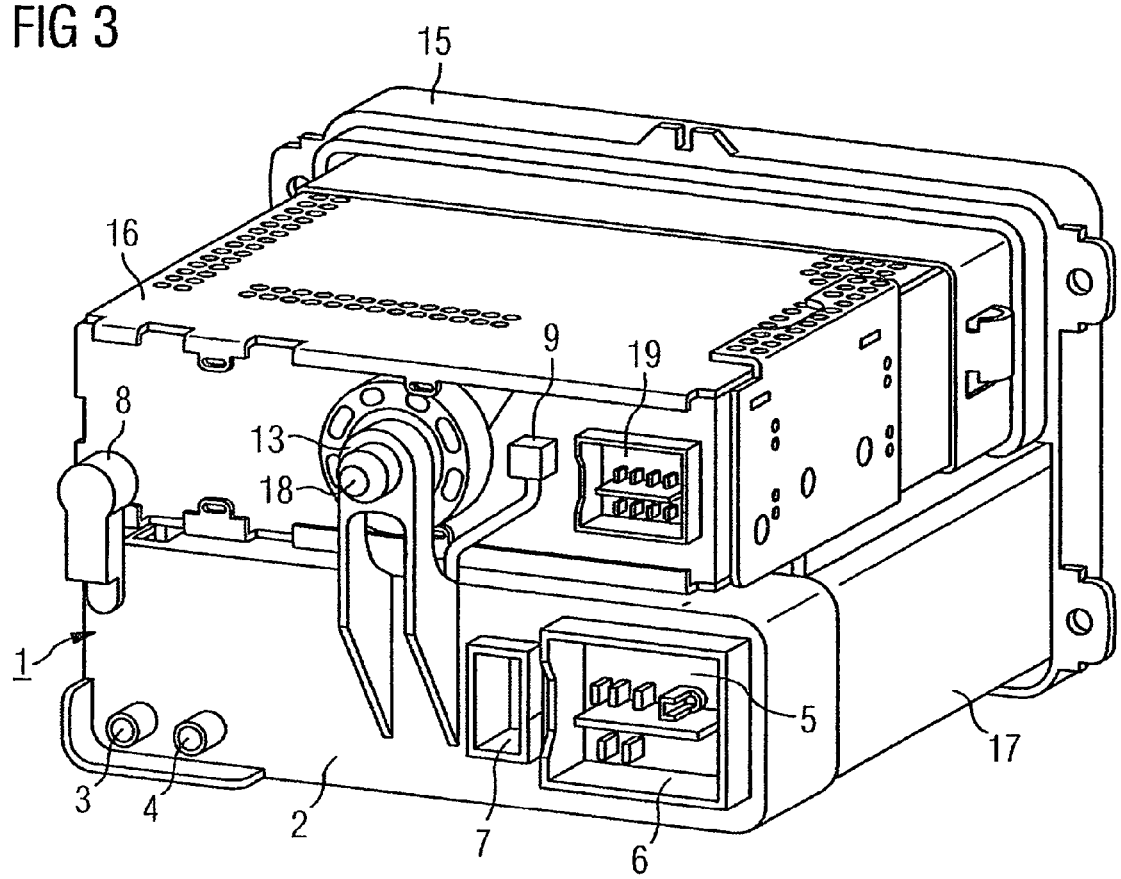
FIG. 3 shows the use of the adapter with a dual DIN installation frame.

FIG. 1 shows an adapter 1 according to the invention in which a plurality of plug-in connectors are integrated in a plastic part 2. The adapter 1 contains antenna plug-in connectors 3, 4 and two multipole plug-in connectors 5, 6 for the purpose of connecting corresponding plug-in connectors of a cable harness of a vehicle. In terms of its connection assignment and arrangement, a further plug-in connector 7 corresponds to a device connection block of a car radio and is provided for connection to the car radio using a cable. The further plug-in connectors 8, 9 are provided for connecting the adapter 1 to corresponding antenna plug-in connectors of the car radio. In contrast to the plug-in connectors 3-7 which are directly integrated in the plastic part 2, the plug-in connectors 8, 9 are connected to the corresponding plug-in connectors 3, 4 via self-supporting connecting lines 10, 11.

FIG. 2 shows a rear view of the adapter 1. It is evident from the figure that the plastic part 2 of the adapter 1 is of essentially parallel-piped design, one of the outer walls being open. The dimensions of the plastic part 2 are selected in such a manner that the latter can be fitted to an installation slot in a motor vehicle and is reliably fixed there.

The adapter 1 also contains a phantom power arrangement 13 for the phantom powering of an antenna. The phantom power arrangement 13 is clipped into the plastic part 2 and is electrically connected to the antenna connectors 3, 8. The adapter 1 thus provides antenna phantom powering irrespective of the car radio used. A printed circuit board 14 on which there are electronic components for implementing a CAN bus connection is also fitted in the plastic part 2. The rear side of the printed circuit board 14 can be seen in FIG. 2, whereas the components are arranged on the front side which cannot be seen. The printed circuit board 14 is electrically connected to the plug-in connectors 7 and 5, 6.

FIG. 3 shows a dual DIN installation frame 15 of a motor vehicle, in the top part of which a car radio 16 is installed. A further device having the external dimensions of a car radio can be installed in the bottom part of the installation frame 15. In the example, however, the lower radio slot 17 is used merely as a storage compartment, the plastic part 2 of the adapter 1 being fitted to the radio slot 17. A further retaining element 13 of the plastic part 2 is fitted to a corresponding retaining element 18 of the car radio and ensures that the adapter 1 is additionally retained. The antenna plug-in connectors 8, 9 of the adapter 1 are directly fitted to corresponding plug-in connectors of the car radio 16. The plug-in connector 7 can now be easily connected to the identical plug-in connector 19 of the car radio 16 using a cable. The corresponding plug-in connectors of a vehicle cable harness can then be inserted into the plug-in connectors 5, 6 of the adapter 1.

The adapter may also contain means 50 (FIG. 1) for implementing a CAN bus connection. Implementing the means 50 provides a car radio which, per se, may not have a CAN bus connection, with an electrical connection to a CAN bus of a vehicle (not shown). The use of the adapter with the means 50 for implementing a CAN bus connection means that a radio without a CAN bus can also be used during retrofitting.

The adapter according to the invention thus results in a clear installation situation, even in the case of different connections of the car radio and of a vehicle cable harness, without directly adapting the connection of the radio to the cable harness of the vehicle.

What is claimed is:

1. An adapter for coupling a car radio to a plug-in electrical connection in a vehicle, the car radio being installable in a radio slot in the vehicle, comprising:
    a base part arranged and dimensioned to be mechanically fixable to a vehicle component that is external to the radio slot in which the car radio is installable and which has no electrical connection to the adapter; and
    a plug-in connection arrangement integrated in the part for electrically and selectively coupling a plug-in connection of a car radio to a corresponding plug-in electrical connection in the vehicle.

2. The adapter of claim 1, wherein the vehicle component is a second radio slot and the part is shaped and dimensioned for mounting to the second radio slot.

3. The adapter of claim 1, wherein the base part has essentially a parallel-piped shape and at least one outer side that is open.

4. The adapter of claim 1, wherein the plug-in connection arrangement comprises at least two multipole electrical plug-in connectors having at least one of a different contact pattern and a different contact assignment.

5. The adapter of claim 1, further comprising an antenna socket, and an antenna connector coupled to the antenna socket by a self-supporting connecting line.

6. The adapter of claim 1, further comprising a control area network (CAN) bus connection.

7. The adapter of claim 5, further comprising an antenna phantom powering unit.

* * * * *